(12) United States Patent
Davies

(10) Patent No.: US 8,220,196 B1
(45) Date of Patent: Jul. 17, 2012

(54) RED FISH LINE

(75) Inventor: Jack D. Davies, Lexington, SC (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 2703 days.

(21) Appl. No.: 09/633,128

(22) Filed: Aug. 4, 2000

(51) Int. Cl.
*A01K 91/00* (2006.01)

(52) U.S. Cl. ...................................................... 43/44.98

(58) Field of Classification Search .................. 43/44.98
See application file for complete search history.

(56) References Cited

U.S. PATENT DOCUMENTS

| | | | | |
|---|---|---|---|---|
| 1,394,616 A | * | 10/1921 | Fredricks | 43/44.98 |
| 1,846,912 A | * | 2/1932 | Sedgley | 43/44.98 |
| 2,809,458 A | * | 10/1957 | Wilbourn | 43/44.98 |
| 3,888,037 A | * | 6/1975 | Warthen | 43/44.98 |
| 4,459,337 A | * | 7/1984 | Hansen | 43/44.98 |
| 4,819,581 A | | 4/1989 | Lakey, Sr. | 119/3 |
| 5,245,782 A | | 9/1993 | Pahle | 3/42.32 |
| 5,540,990 A | * | 7/1996 | Cook | 43/44.98 |
| 5,551,185 A | | 9/1996 | Reed | 43/42.39 |
| 5,819,464 A | | 10/1998 | Jovanovich | 43/10 |
| 6,055,763 A | | 5/2000 | Trotter | 43/17.6 |
| 6,101,755 A | * | 8/2000 | Kent | 43/44.98 |

FOREIGN PATENT DOCUMENTS

| | | | | |
|---|---|---|---|---|
| AU | 225510 | * | 2/1958 | 43/44.98 |
| EP | 0312039 | * | 4/1989 | 43/44.98 |
| GB | 6460 | * | 0/1910 | 43/44.98 |
| JP | 0163419 | * | 9/1984 | 43/44.98 |
| JP | 1194214 | * | 8/1986 | 43/44.98 |
| JP | 2051940 | * | 3/1987 | 43/44.98 |
| JP | 3296641 | * | 12/1988 | 43/44.98 |
| JP | 2265424 | * | 10/1990 | 43/44.98 |
| JP | 4004832 | * | 1/1992 | 43/44.98 |
| JP | 4011010 | * | 1/1992 | 43/44.98 |
| JP | 3227812 | * | 9/1998 | 43/44.98 |
| NO | 32929 | * | 12/1922 | 43/44.98 |

OTHER PUBLICATIONS

Cabela'S Master Catalog, Spring 2000, p. 53, Maxima Fibre Glow Line.*
The Camper's Own Book, The Log cabin Press, 1912, p. 132.*
M.A. Hanna Color MSDS for Part No. 8208A # (pp. 1-5 & 7), dated Jun. 15, 1999.
*Plastics Compounding Redbook*, Advanstar Communications, vol. 23, Jun. 2000, (pp. 1, 85-92).
Daiichi Bleeding Bait Hooks, (1999).

* cited by examiner

*Primary Examiner* — Darren W Ark
(74) *Attorney, Agent, or Firm* — Fellers, Snider, Blankenship, Bailey & Tippens. P.C.

(57) ABSTRACT

A fish line having a red color defined by a hue value of a LCH measurement of a colorimeter of between −11.5 and −13.5 is shown to get more strikes than fish line of other colors, thereby providing the user with an opportunity to catch more fish. The red fish line includes a red colorant which provides increased abrasion resistance compared to fish line comprised of the same synthetic or natural materials but a different or no colorant.

16 Claims, No Drawings

RED FISH LINE

TECHNICAL FIELD

This invention relates to fish line and, more particularly, to red-colored fish line. Specifically, the present invention relates to a fish line having a red color defined by a hue value (H value) on an LCH measurement scale of a colorimeter of between −11.5 and −13.5. It has been found that red-colored fish line gets more strikes of fish than fish line of other colors, thereby providing the angler with an opportunity to catch more fish. The fish line preferably includes a red colorant which provides increased resistance to rod abrasion and sand paper abrasion and increased knot strength as compared to fish line comprised of the same materials but having a different or no colorant.

BACKGROUND OF THE INVENTION

The manufacture of fish line is well known in the art and can be accomplished in any of a number of ways. Most common is for one or more resins to be extruded through one or more die heads and drawn to an appropriate denier and diameter for use as monofilament fishing line. This extruded filament may then be used as a monofilic fish line or be braided as is well known in the art. Alternatively, resins can be extruded to form bicomponent filaments as are known in the art. It will be appreciated that fish line can also be made from natural fibers such as cotton or wool, as well as synthetic materials. Other methods of manufacturing fish line, including but not limited to gel spinning, are also contemplated by the present invention.

It has sometimes been found desirable to provide one or more colors to the filament used in making the fish line. Dyeing or pigmenting are two well known methods for coloring such filaments and the like and can be accomplished in any of a number of different ways. For example, one method is to blend the pigment or dye with one or more base resins and then feed them into a hopper for extrusion. Another method is to employ a "color concentrate" which utilizes a plastic or resin which has already been "pre-colored" or loaded with an extremely high concentration of dye or pigment. The color concentrate is then blended with the base resin(s) in the hopper and extruded as known in the art. Still further, the pigments may be added just prior to extrusion (outside of the hopper) or during extrusion (using a second extruder). Other methods of dyeing or pigmenting, including but not limited to solution dyeing, are also contemplated by the present invention.

Generally, the prior art with respect to fish line has sought to provide a fish line which was either less visible to the fish or more visible to the angler. Thus, there is substantial prior art relating to the production of both clear and transparent fish line as well as "non-clear" line. The purpose of the clear fish line was to attempt to make the line as invisible as possible. It is understood that at least one company has attempted to make the refractive index of its fish line match that of water such that the fish would not be able to tell the difference. However, anglers sometimes have a hard time seeing the line themselves. Consequently, various colors of fish line have been produced, but only colors which were believed to provide a benefit to the angler in catching fish. To that end, most "colored" fish lines have been dyed blue, brown or green in order to approximate the color of the water being fished. That is, it was thought that by using blue fish line in bluish waters, brown line in brownish waters, and green fish line in greenish waters, the fish would be less susceptible to being "spooked" by the line itself and would be harder for the fish to see. Fish lines have been dyed other colors as well, including yellow, orange, and pink. There is even one "multi-colored" fish line known to use repeating patterns of at least four different colors—blue, green, red and yellow—in very short segments (less than three feet) along the entire line.

Heretofore, however, fish line has never been substantially red. By "substantially red," it is meant that at least 50 percent of the fish line capable of being in contact with the water is red. In fact, there has never been a fish line wherein more than 25 percent of the line is red. As used herein, the term "fish line" shall include all types of fishing lines, including fly lines, long lines and the like, as well as all parts of a fishing line where one or more filaments may be used in the production thereof, such as tippets and leaders. The term does not include lures, sinkers, floaters, rods, reels, hooks, nets, or other parts of a fishing tackle where filaments are not typically employed. Making red fish line would appear to go against the logic of the prior art wherein it is believed that the fish line should be made to be less visible to the fish.

It will be appreciated that many lures and floaters may be red in color. The red color of the floater is typically used to permit the angler to see it. On the other hand, any red color on the lure is typically used to fool the fish into thinking the lure is bleeding or is otherwise disabled. It is understood that at least one hook manufacturer makes red-colored hooks, again to fool the fish into thinking that the bait is bleeding.

Other patents and prior art relating to fish line have attempted to provide improved physical properties to the line. Two important physical characteristics of fish line are resistance to abrasion and knot strength. It is believed desirable to the angler to provide a fish line which has an increased resistance to abrasion and improved knot strength. However, attempts to provide improvements in these properties have met with limited success.

Most desirable to the angler, however, is a fish line which gets more strikes of the bait by fish than other fish lines, thereby providing the angler with the opportunity to catch more fish. A fish line that catches more fish is highly sought after by anglers.

SUMMARY OF INVENTION

It is, therefore, a aspect of the present invention to provide a fish line that is red in color.

It is another aspect of the present invention to provide a fish line, as above, which gets more strikes or catches more fish than other clear or colored fish line.

It is yet another aspect of the present invention to provide a fish line, as above, which has an increased resistance to abrasion and improved knot strength.

At least one or more of the foregoing aspects, together with the advantages thereof over the known art relating to fish line, which shall become apparent from the specification that follows, are accomplished by the invention as hereinafter described and claimed.

In general, the present invention provides a fish line having a red color defined by a hue (H) value of an LCH measurement of a colorimeter of between −11.5 and −13.5. This fish line is shown to get more strikes while fishing than other fish line of a different color, thereby providing the angler with an opportunity to catch more fish. Furthermore, the fish line of the present invention, which includes at least one base resin and a red colorant to produce the red fish line described herein, has an increased resistance to abrasion and increased knot strength as compared to fish line of a clear color or other pigmented color.

PREFERRED EMBODIMENT FOR CARRYING OUT THE INVENTION

As noted hereinabove, the present invention is directed toward a red-colored fish line. By the term "red-colored" it is meant that the fish line has a red color defined by a hue (H) value of an LCH measurement of a colorimeter of from about −11.5 to about −13.5. More preferably, the red-color definition may also include a chroma (C) value of an LCH measurement of a colorimeter of at least +40. The term "fish line" is defined hereinabove as including all types of fishing lines, including fly lines, long lines and the like, as well as all parts of a fishing line where one or more filaments may be used in the production thereof, such as tippets and leaders. The term does not include lures, sinkers, floaters, rods, reels, hooks, nets, or other parts of a fishing tackle where filaments are not typically employed.

More particularly, the fish line of the present invention will have a red color for at least 50 percent and, more preferably, for 100 percent, of that part of the line that may come into contact with the water. Therefore, there will be at least a three-foot section or portion of the line which will be colored red as defined herein. Even more preferably, more than 25 percent of the fish line will be colored red, and it is still more desirable to have 50 percent, 75 percent or the entire fish line colored red.

The fish line of the present invention comprises at least one base resin and a red colorant. The base resin may be any natural or synthetic material from which fish line is commonly made. Typically, such resins include but are not limited to polyolefins and polyamides, and copolymers and terpolymers thereof. Natural materials include cotton and wool. Particularly suitable for the present invention are nylon copolymers and terpolymers.

Any red colorant known in the art capable of producing the red-colored fish line as defined by the H value of the colorimeter may be employed in the present invention. Such colorants are typically either pigments or dyes. Dyes are organic compounds which are typically used in very small amounts (about 0.2 grams or less) per unit (10 lbs.) of base resin. Their varying levels of thermal stability and lightfastness often limit their utility however, as well as the fact that they are much more expensive than pigments.

Pigments, on the other hand, may be either organic or inorganic and are the primary colorants for plastic or synthetic materials. They are also typically used in larger amounts (about 2 grams or more) per unit (10 lbs.) of base resin.

Organic pigments are complex chemical compounds that contain one or more conjugated or aromatic structures and exhibit small particle size, greater transparency, and color strength. Examples of red organic pigments believed suitable for the present invention include pyrazolone pigments, Lake Red C, and Permanent Red 2B. Other particularly preferred red organic pigments suitable for use with nylon-based resins, include, but are not limited to, Perylene Red, Quinacridone Red, and Disazo condensation pigments.

Inorganic pigments are metallic compounds that are typically larger in size, smaller in surface area, and denser than organic pigments. Most common of these pigments for use in the red range are cadmium salts. For a more detailed discussion of the types of colorants suitable for use in the production of monofilaments and the like, the reader is referred to "Colorants," *Plastics Compounding Redbook* 2001, Advanstar Communications, Cleveland, Ohio, Vol. 23, pgs. 39-42 and 85-91 (June 2000), the disclosure of which is incorporated herein by reference.

The dyes and pigments utilized in the present invention may be blended with the base resin in any of a number of ways as is known in the art and discussed hereinabove. More particularly, the colorant may be blended with one or more base resins and then feed into a hopper for extrusion. Alternatively, a "color concentrate" of the colorant may be employed which utilizes a plastic or resin that has already been loaded with an extremely high concentration of colorant. The color concentrate is then blended with the base resin(s) in the hopper and extruded as known in the art. Still further, the pigments may be separately fed to the extruder from outside the hopper containing the base resin(s) or may be fed into a separate, second extruder during the extrusion of the base resin(s). Other methods of dyeing or pigmenting, including but not limited to solution dyeing, are also contemplated by the present invention.

In a preferred embodiment of the present invention, a dark red dry pigment available from M. A. Hanna, Gastonia, N.C., under the product designation PMS Red 8208A is blended, either as a powder or as a color concentrate, in the hopper with a base resin, preferably nylon 6.66. The PMS Red 8208A has a color strength of between 95 and 105 and, while proprietary, is believed to be an organic pigment. In the preferred embodiment, from about 2 to about 7 grams of PMS Red 8208A is blended with about 10 pounds of a base resin, i.e., nylon 6.66. The blend is then extruded through a single screw extruder at a rate and draw ratio sufficient to form a red-colored monofilament having a diameter size and denier suitable for use as a fish line.

It will be appreciated that the fish line of the present invention can be monofilic or braided as is well known in the art, and can be manufactured, such as by extruding or gel spinning, as is also well known in the art. In extruding the fish line, the line can be made from a single source, thereby providing a monofilament-like structure, or from more than one source, thereby providing for the possibility of a multi-component structure.

Quite surprisingly, it has been found that the red-colored fish line of the type described hereinabove gets more strikes of fish than fish line of a clear or different color, and thereby allows the angler to catch more fish. To define the red color, a colorimeter is used and an LCH measurement is taken. The light transparency, i.e., the L value, of the measurement is generally of little or no consequence in defining the color. While the chroma value, i.e., the C value, may add some definition to the color as to its sheen and the like, the hue value, i.e., the H value, is the most important value in measuring and determining the color of the fish line using the colorimeter. To that end, a red color having a hue (H) value of from about −11.5 to about −13.5 is desired. More preferably, a hue (H) value of the LCH measurement scale of the colorimeter of between about −12 and about −13 is desired. In addition, it is preferred that the colorimeter show a chroma (C) value of at least +20 and, more preferably, +40.

Furthermore, it has been unexpectedly found that the red-colored fish line has improved abrasion resistance and knot strength as compared to other fish lines of clear or different color. In fact, most "non-red" colorants have been found to decrease resistance to rod abrasion.

In addition to fish line, it will be appreciated that the red filaments comprising the base resin and the red colorant may have further application in other products, including woven fabrics (e.g., press felts) or non-woven applications. These red-colored filaments have been shown to have increased rod and sand paper abrasion and increased knot strength compared to filaments not having the red colorant.

In order to demonstrate practice of the invention, four sample blends of a pigment, PMS Red 8208A, and a base resin, nylon 6.66, were prepared and extruded through a twin screw extruder to form filament samples suitable for use as fish line. More particularly, these sample blends included 2 grams, 4 grams, 5.5 grams and 7 grams, respectively, of PMS Red pigment per 10 pounds of nylon 6.66. Each sample was extruded into a monofilament having a diameter of 15 mils. A clear, 15 mil-diameter monofilament having no colorant added was also prepared in a like manner as a control. The samples were then placed in a Minolta CR-200 colorimeter to determine their hue (H) and chroma (C) values by wrapping each monofilament around a test card and placing the test card in the colorimeter to provide a LCH measurement. As shown in Table I hereinbelow, each of the red-colored fish lines had an H value of between −12 and −13, while the clear fish line (control) had an H value of about −0.6. Similarly, the C value of each filament was determined with each red monofilament fish line having a C value of at least +40 while the clear line (control) had a C value of between −0.12 and −1.35. These samples are illustrative only and not meant to necessarily limit the scope of the present invention, the invention being measured by the scope and spirit of the claims.

These monofilament fish lines were then tested for knot strength and resistance to abrasion. In particular, the line were subject to a sand paper abrasion test and a rod abrasion test. The sand paper abrasion test involves suspending a weighted filament vertically so that it is in contact with a continuously moving sand paper strip. A reciprocating roller moves so that the filament moves up and down a length of 3 inches (7.6 cm) against the sand paper. Other rollers arrange the filament so that its contact with the sand paper is 1 inch (2.5 cm) long. The sand paper moves at a speed of 4 inches (10.2 cm) per minute in an upward direction with respect to the filament. The sand paper used in 1 inch (2.5 cm) wide with 320 J grit. The weight used on the filament is 250 grams. The test continues until the filament breaks.

The rod abrasion test involves passing a horizontally-oriented filament through a ceramic guide and allowing it to hang vertically while holding a weight. The weight used is typically determined by the size of the filaments and, in this case, was 500 grams. The horizontal end of the filament is moved back and forth (about 4 inches) so that abrasion eventually occurs at the ceramic guide. Each back and forth movement is considered one cycle. In this test, a limited number of cycles, typically, anywhere from 200 to 800, are performed, and in this case, 600 cycles were used. In this test, the monofilaments were subject to wet abrasion testing which is essentially the same as dry testing except that the ceramic guides on the abrader are in contact with water and the weight is suspended in water. Once the cycles were completed, the lines were removed from the abrader and subjected to tensile testing using an Instron machine to determine the tensile at break of the filament.

Knot strength for the sample monofilaments were tested by tying a simple square knot in the filament. The tag ends of the knot were placed in an Instron machine, and the line was pulled to the breaking point. The pounds-to-break were recorded as the common knot strength.

The results of the various tests are presented herein in Table I.

TABLE I

Physical Testing of Fish Line Samples

| Sample # and Color | Amount Colorant (g/10 lbs. resin) | Diameter (mil) | Rod Abrasion (500 g) 600 Wet Cycles Tensile at break (lbs.) | Common Knot Strength (lbs.) | Sand Paper Abrasion (Cycles to break) | Hue H Value | Chroma C Value |
|---|---|---|---|---|---|---|---|
| 1 (RED) | 2 | 15 | 15.752 | 15.034 | 29.4 | −12.95 | +40.34 |
| 2 (RED) | 4 | 15 | 16.812 | 15.556 | 37.8 | −12.58 | +41.61 |
| 3 (RED) | 5.5 | 15 | 17.704 | 16.928 | 33 | −12.43 | +40.20 |
| 4 (RED) | 7 | 15 | 17.948 | 16.964 | 31 | −12.08 | +40.36 |
| 5 (Clear) | 0 | 15 | 15.132 | 14.444 | 18.2 | −0.56 | +40.36 |

The results of the tests show a near-linear correlation for each of four red-colored sample monofilament fish lines which had increased knot strength as well as increased resistance to abrasion, both under the sand paper abrasion test and the rod abrasion test, as compared to the clear monofilament fish line (control).

In addition, physical testing of knot strength and abrasion resistance was conducted on other monofilic fish lines as well. In particular, 5.5 grams of a colorant selected from the pigment colors of orange, green and blue as well as the preferred red colorant (PMS Red 8202A) of the present invention were blended and extruded with a base resin of nylon 6.66 to form monofilament fish lines having a diameter of about 18 mils. A clear, 18-mil diameter monofilament fish line (control) having no colorant was also extruded. While not shown, the red monofilament met the color parameters, i.e., at least the H and preferably the C values, set forth in defining the monofilament suitable for use as a red-colored fish line. None of the other colorants met this definition of a red-colored fish line and were, in fact, orange, green, blue and clear.

The results of the tests performed for abrasion resistance and knot strength are shown in Table II.

TABLE II

Physical Testing of Colored and Clear Fish Lines

| Sample Color | Amount of Colorant (g/10 lbs. resin) | Diameter (mil) | Sand Paper Abrasion (Cycles to break) | Wet Rod Abrasion (after 800 cycles) Tensile (lbs.) | Wet Knot Strength Tensile (lbs.) |
|---|---|---|---|---|---|
| Clear | 0 | 18 | 25 | 14.314 | 23.948 |
| Orange | 5.5 | 18 | 29.2 | 14.912 | 23.068 |
| Green | 5.5 | 18 | 30.6 | 15.194 | 21.922 |
| Blue | 5.5 | 18 | 33.2 | 13.984 | 23.376 |
| Red | 5.5 | 18 | 38.2 | 16.874 | 25.398 |

As demonstrated, it is evident that the red-colored fish line of the present invention provides increased resistance to both rod and sand paper abrasion as well as increased knot strength as compared to like fish line of a different or clear color. The red-colored fish line took at least five (5) more cycles to break (38.2 cycles to 33.2 cycles) in the sand paper abrasion test than did any of the other lines, had a knot strength at least 1.8 pounds greater (16.874 lbs. to 15.194 lbs.) than any of the other lines, and had a tensile at break of at least 1.3 pounds more (25.398 lbs. to 23.948 lbs.) after 800 wet cycles under the rod abrasion test. In fact, it appears that most colorants tend to decrease resistance to rod abrasion, not increase it.

In order to demonstrate that the red-colored fish line gets more strikes and thereby catches more fish, several professional and amateur anglers have tested the red-colored line. These tests have been conducted thus far while bass fishing and speckled trout fishing. In one study conducted over Jul. 5 and 6, 2000, various diameters of red-colored and clear-colored fish line was used with various but identical rods and reels, baits and lures to catch speckled trout. Over the two days, eighteen (18) trout were caught by the anglers using the red-colored fish line while only five (5) trout were caught by the anglers using the clear fish line. Thus, a ratio of 3.4:1 more fish were caught using the red line than the clear line. It is believed that the ratio of the number of strikes of fish was even higher.

Similarly, a competitive bass fisherman tested the red-colored fish line in June 2000. He won each of the three tournaments he entered by an average of more than eight (8) pounds. In another instance, this fisherman and his father fished for bass using a red-colored fish line and a green-colored fish line with similar baits. The red-colored fish line caught twelve (12) fish in one morning to early afternoon compared to only three (3) fish for the green-colored line, a ratio of 4:1. Again, the number of strikes of fish were believed to be at an even higher ratio. In a similar outing the next week, the red-colored line caught seven (7) bass in an evening to one (1) bass for the green-colored line.

In still another instance, a test angler attests that he caught fish at a 9:1 ratio using the red-colored fish line versus lines colored yellow, green, blue, and clear, again using similar baits. In each instance of which the Applicant is aware to date, the red-colored fish line has always had more strikes and caught more fish than any other colored fish line in both fresh water or salt water.

Without being limited to any theory, it is believed that the line may be less visible under water or that the fish may become more excited into striking than with other colored fish lines. In any event, more fish are striking the red-colored fish line and more anglers are catching fish using the red-colored fish line as compared to any other colored or clear fish line using the same or similar baits, lures, rods and reels.

Thus it should be evident that the fish line of the present invention is highly effective in getting more strikes of fish as compared to other fish line of different or no color. The invention is particularly suited for monofilament fishing line, but is not necessarily limited thereto. At least bicomponent and braided lines, as well as gel spun lines are also contemplated by the present invention. The fish line of the present invention can be used as any type of fish line, including as a fly line or a long line, or as another part of a fishing tackle, including the leader or tippet. Further, the red filaments of the present invention can be used in other applications where improved abrasion and/or knot strength is generally desired.

Based upon the foregoing disclosure, it should now be apparent that the use of the fish line described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the base resin(s) according to the present invention are not necessarily limited to nylon and copolymer or terpolymers thereof. Other base resins known in the art as being suitable for use as fish line may other be employed. Moreover, other red colorants as described hereinabove can be substituted for the PMS Red 8208A described. Thus, the scope of the invention shall include all modifications and variations that may fall within the scope of the attached claims.

What is claimed is:

1. A fishing line comprising a base resin blended with a red pigment, wherein the fishing line has an increased abrasion resistance as compared to fishing line having the same base resin but a different or no pigment.

2. The fishing line according to claim 1, wherein the base resin is a polyamide.

3. The fishing line according to claim 1, wherein the fishing line has a wet rod abrasion tensile at break after 600 cycles of at least 16 pounds.

4. The fishing line according to claim 1 wherein the fishing line is transparent underwater.

5. A fishing line comprising a base resin blended with a red pigment wherein the fishing line has an increased knot strength as compared to fishing line having the same base resin but a different or no pigment.

6. The fishing line according to claim 5, wherein the base resin is a polyamide.

7. The fishing line according to claim 5, wherein the fishing line has a common knot strength of at least 15 pounds.

8. The fishing line according to claim 5 wherein the fishing line is transparent underwater.

9. A fishing line having a red color defined by a hue value of a LCH measurement of a colorimeter of between −11.5 and −13.5 along its entire length, wherein the fishing line is a polyamide monofilament.

10. A fishing line having a red color defined by a hue value of a LCH measurement of a colorimeter of between −11.5 and −13.5 along its entire length, wherein the fishing line is a polyamide monofilament having a transparent appearance in water.

11. The fishing line according to claim 10, wherein the red color is defined by a hue value of between −12 and −13.

12. The fishing line according to claim 10, wherein the red color is further defined by a chroma (C) value of the LCH measurement of the colorimeter of at least +40.

13. The fishing line according to claim 10, wherein the fishing line comprises a first component of a first resin and at least a second component of a different resin.

14. The fishing line according to claim 10, wherein the fishing line is gel spun.

15. The fishing line according to claim 10, wherein the fishing line is a fly line.

16. The fishing line according to claim 10, wherein the fishing line is a long line.

* * * * *